United States Patent
Duncan et al.

(10) Patent No.: US 6,647,453 B1
(45) Date of Patent: Nov. 11, 2003

(54) SYSTEM AND METHOD FOR PROVIDING FORWARD PROGRESS AND AVOIDING STARVATION AND LIVELOCK IN A MULTIPROCESSOR COMPUTER SYSTEM

(75) Inventors: Samuel H. Duncan, Arlington, MA (US); Steven Ho, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 09/652,984

(22) Filed: Aug. 31, 2000

(51) Int. Cl.⁷ ........................ G06F 13/36; G06F 13/00; G06F 12/00
(52) U.S. Cl. ..................... 710/306; 710/100; 710/104; 710/300; 710/310; 711/141
(58) Field of Search ................................ 710/100, 300, 710/104, 306, 310; 711/141

(56) References Cited

U.S. PATENT DOCUMENTS

| | | | |
|---|---|---|---|
| 5,515,523 A | | 5/1996 | Kalkunte et al. |
| 5,625,779 A | | 4/1997 | Solomon et al. |
| 5,884,100 A | | 3/1999 | Normoyle et al. |
| 6,014,690 A | | 1/2000 | VanDoren et al. |
| 6,035,376 A | * | 3/2000 | James ........................ 711/145 |
| 6,078,997 A | * | 6/2000 | Young et al. ................ 711/144 |
| 6,094,686 A | | 7/2000 | Sharma |
| 6,247,102 B1 | | 6/2001 | Chin et al. |
| 6,389,526 B1 | * | 5/2002 | Keller et al. ................. 712/30 |

OTHER PUBLICATIONS

Chapter 3 Memory Management, http://www.linuxdoc.org/LDP/tlk/mm/memory.html, (c) 1996–1999, pp. 1–23.
Multiprocessors (7 pages).

Russo, Andrew P., The AlphaServer 2100 I/O Subsystem, http://www.digital.com, (c) 1994, pp. 1–13.

Duncan, Samuel H., Keefer, Craig D., McLaughlin, Thomas A., High Performance I/O Design in the AlphaServer 4100 Symmetric Multiprocessing System, Compaq Digital Technical Jounrnal, pp. 1–24.

Steinman, Maurice B., Harris, George J., Kocev, Andrej, Lamere, Virginia C. and Pannell, Roger D., The AlphaServer 4100 Cached Processor Module Architecture and Design, Digital Technical Journal, pp. 1–29.

Bannon, Peter, Alpha 21364: A Scalable Single–chip SMP, (c) 1999, pp. 1–4.

New Compaq AlphaServer GS Series Architecture White Paper, Compaq Computer Corporation, (c)2000, pp. 1–11.

* cited by examiner

Primary Examiner—Tim Vo

(57) ABSTRACT

A system and method avoids "livelock" and "starvation" among two or more input/output (I/O) devices of a symmetrical multiprocessor (SMP) computer system competing for the same data. The SMP computer system includes a plurality of interconnected processors, one or more memories that are shared by the processors, and a plurality of I/O bridges to which the I/O devices are coupled. A cache coherency protocol is executed the I/O bridges, which requires the I/O bridges to obtain "exclusive" (not shared) ownership of all data stored by the bridges. In response to a request for data currently stored by an I/O bridge, the bridge first copies at least a portion of that data to a non-coherent buffer before invalidating the data. The bridge then takes the largest amount of the data saved in its non-coherent buffer that its knows to be coherent, and releases only that known coherent amount to the I/O device, and then discards all of the saved data.

11 Claims, 10 Drawing Sheets

SYSTEM AND METHOD FOR PROVIDING FORWARD PROGRESS AND AVOIDING STARVATION AND LIVELOCK IN A MULTIPROCESSOR COMPUTER SYSTEM

INCORPORATION BY REFERENCE OF RELATED APPLICATIONS

This patent application is related to the following co-pending, commonly owned U.S. Patent Applications, all of which were filed on even date with the within application for United States Patent and are each hereby incorporated by reference in their entirety:

U.S. patent application Ser. No. 09/652,644 entitled ADAPTIVE DATA PREFETCH PREDICTION ALGORITHM;

U.S. patent application Ser. No. 09/653,133 entitled UNIQUE METHOD OF REDUCING LOSSES IN CIRCUITS USING $V^2$ PWM CONTROL;

U.S. patent application Ser. No. 09/652,641 entitled IO SPEED AND LENGTH PROGRAMMABLE WITH BUS POPULATION;

U.S. patent application Ser. No. 09/652,458 entitled PARTITION FORMATION USING MICROPROCESSORS IN A MULTIPROCESSOR COMPUTER SYSTEM;

U.S. Provisional Patent Application Ser. No. 60/304,167 entitled SYSTEM AND METHOD FOR USING FUNCTION NUMBERS TO INCREASE THE COUNT OF OUTSTANDING SPLIT TRANSACTIONS;

U.S. patent application Ser. No. 09/653,180 entitled ONLINE ADD/REMOVAL OF SERVER MANAGEMENT INFRASTRUCTURE;

U.S. patent application Ser. No. 09/652,494 entitled AUTOMATED BACKPLANE CABLE CONNECTION IDENTIFICATION SYSTEM AND METHOD;

U.S. patent application Ser. No. 09/652,459 entitled CLOCK FORWARDING DATA RECOVERY;

U.S. patent application Ser. No. 09/652,980 entitled CLOCK FORWARD INITIALIZATION AND RESET SIGNALING TECHNIQUE;

U.S. patent application Ser. No. 09/944,515 entitled PASSIVE RELEASE AVOIDANCE TECHNIQUE;

U.S. patent application Ser. No. 09/652,985 entitled COHERENT TRANSLATION LOOK-ASIDE BUFFER;

U.S. patent application Ser. No. 09/652,645 entitled DETERMINISTIC HARDWARE BEHAVIOR BETWEEN MULTIPLE ASYNCHRONOUS CLOCK DOMAINS THROUGH THE NOVEL USE OF A PLL; and U.S. patent application Ser. No. 09/655,171 entitled VIRTUAL TIME OF YEAR CLOCK.

BACKGROUND OF THE INVENTION

1. Field of the Invention

This invention relates to computer architectures and, more specifically, to distributed, shared memory multiprocessor computer systems.

2. Background Information

Distributed shared memory computer systems, such as symmetric multiprocessor (SMP) systems support high-performance application processing. Conventional SMP systems include a plurality of processors coupled together by a bus. One characteristic of SMP systems is that memory space is typically shared among all of the processors. That is, each processor accesses programs in the shared memory, and processors communicate with each other via that memory (e.g., through messages and status information left in shared address spaces). In some SMP systems, the processors may also be able to exchange signals directly. One or more operating systems are typically stored in the shared memory. These operating systems control the distribution of processes or threads among the various processors. The operating system kernels may execute on any processor, and may even execute in parallel. By allowing many different processors to execute different processes or threads simultaneously, the execution speed of a given application may be greatly increased.

FIG. 1 is a block diagram of a conventional SMP system 100. System 100 includes a plurality of processors 102a–e, each connected to a system bus 104. A memory 106 and an input/output (I/O) bridge 108 are also connected to the system bus 104. The I/O bridge 108 is also coupled to one or more I/O busses 110a–c. The I/O bridge 108 basically provides a "bridging" function between the system bus 104 and the I/O busses 110a–c. Various I/O devices 112, such as disk drives, data collection devices, keyboards, CD-ROM drives, etc., may be attached to the I/O busses 110a–c. Each processor 102a–e can access memory 106 and/or various input/output devices 112 via the system bus 104. Each processor 102a–e has at least one level of cache memory 114a–e that is private to the respective processor 102a–e.

The cache memories 114a–e typically contain an image of data from memory 106 that is being utilized by the respective processor 102a–e. Since the cache memories of two processors (e.g., caches 114b and 114e) may contain overlapping or identical images of data from main memory 106, if one processor (e.g., processor 102b) were to alter the data in its cache (e.g., cache 114b), the data in the other cache (e.g., cache 114e) would become invalid or stale. To prevent the other processor (e.g., processor 102e) from acting on invalid or stale data, SMP systems, such as system 100, typically include some type of cache coherency protocol.

In general, cache coherency protocols cause other processors to be notified when an update (e.g., a write) is about to take place at some processor's cache. Other processors, to the extent they also have copies of this same data in their caches, may then in validate their copies of the data. The write is typically broadcast to the processors which then update the copies of the data in their local caches. Protocols or algorithms, some of which may be relatively complex, are often used to determine which entries in a cache should be overwritten when more data than can be stored in the cache is received.

I/O bridge 108 may also include one or more cache memories (not shown) of its own. The bridge cache is used to store data received via system bus 104 from memory 106 and/or the processor caches 114 that is intended for one or more of the I/O devices 112. That is, bridge 108 forwards the data from its cache onto one or more of the I/O busses 110. Data may also be received by an I/O device 112 and stored at the bridge cache before being driven onto system bus 104 for receipt by a processor 102 or memory 106. Generally, the data stored in the cache of I/O bridge 108 is not coherent with the system 110. In small computer systems, it is reasonable for an I/O bridge not to maintain cache coherence for read transactions because those transactions (fetching data from the cache coherent domain) are implicitly ordered and the data is consumed immediately by the device.

However, in large computer systems with distributed memory, I/O devices, such as devices 112, are not guaranteed to receive coherent data.

U.S. Pat. No. 5,884,100 to Normoyle et al. discloses a single central processing unit (CPU) chip in which an I/O system is disposed on (i.e., built right onto) the core or package of the CPU chip. That is, Normoyle discloses an I/O system that is part of the CPU chipset. Because the I/O system in the Normoyle patent is located in such close proximity to the CPU, and there is only one CPU, the Normoyle patent is purportedly able to keep the I/O system coherent with the CPU.

In symmetrical multiprocessor computer systems, however, it would be difficult to incorporate the I/O system onto the processor chipset. For example, the Normoyle patent provides no suggestion as to how its I/O system might interface with other CPUs or with other I/O systems. Thus, a need exists for providing cache coherency in the I/O domain of a symmetrical multiprocessor system.

However, by imposing cache coherency on the I/O domain of a symmetrical multiprocessor computer system, other problems that could degrade system's performance may result. For example, some cache coherency protocols, if applied to the I/O bridge, may result in two or more I/O devices, who are competing for the same data, becoming "livelocked". In other words, neither I/O device is able to access the data. As a result, both devices are "starved" of data and are unable to make any progress in their respective processes or application programs. Accordingly, a need exists, not just for providing cache coherency in the I/O domain, but for also ensuring continued, high-level operation of the symmetrical multiprocessor system.

SUMMARY OF THE INVENTION

Briefly, the invention relates to a system and method for avoiding "livelock" and "starvation" among two or more input/output (I/O) devices competing for the same data in a symmetrical multiprocessor (SMP) computer system. The SMP computer system includes a plurality of interconnected processors having corresponding caches, one or more memories that are shared by the processors, and a plurality of I/O bridges to which the I/O devices are coupled. Each I/O bridge includes one or more upstream buffers and one or more downstream buffers. An up engine is coupled to the upstream buffer and is controls the flow of information, including requests for data, from the I/O devices to the processors and shared memory. A down engine is coupled to the downstream buffer, and controls the flow of information from the processors and shared memory to the I/O devices. A cache coherency protocol is executed in the I/O bridge in order to keep the data in the downstream buffer coherent with the processor caches and shared memory. As part of the cache coherency protocol, the I/O bridge obtains "exclusive" (not shared) ownership of all data fetched from the processor caches and the shared memory, and invalidates and releases any data in the downstream buffer that is requested by a processor or by some other I/O bridge.

To prevent two I/O devices from becoming "livelocked" in response to competing requests for the same data, each I/O bridge further includes at least one non-coherent memory device which is also coupled to and thus under the control of the down engine. Before invalidating data requested by a competing device or entity, the down engine at the I/O bridge receiving the request-first copies that data to the bridge's non-coherent memory device. The down engine then takes the largest amount of the copied data that it "knows" to be coherent (despite the request for that data by a processor or other I/O bridge) and releases only that amount to the I/O device which originally requested the data from the bridge. In the illustrative embodiment, this "known" coherent amount of data corresponds to one I/O bus cycle. The remaining data that was copied into the non-coherent memory device is then discarded. In this way, the I/O device that originally requested the data is guaranteed to make at least some forward progress despite data collisions, and yet data coherency is still maintained within the I/O domain of the SMP computer system.

In another embodiment of the invention, the I/O bridge includes a single, dual-property buffer configured to store both coherent and non-coherent data. Each entry of the dual-property buffer includes a tag that specifies whether the respective entry contains coherent or non-coherent data. As data is entered into a buffer entry in response to request for exclusive ownership of that data, the I/O bridge sets the respective tag to indicate that the data is coherent. If the data is subsequently requested by a competing device or entity, the I/O bridge changes the respective tag from coherent to non-coherent. For buffer entries whose tag indicates that the data is non-coherent, the I/O bridge preferably releases to the target I/O device only that amount "known" to be coherent.

BRIEF DESCRIPTION OF THE DRAWINGS

The above and further advantages of the invention may be better understood by referring to the following description in conjunction with the accompanying drawings, in which like reference numbers indicate identical or functionally similar elements.

DETAILED DESCRIPTION OF AN ILLUSTRATIVE EMBODIMENT

Figure 1:
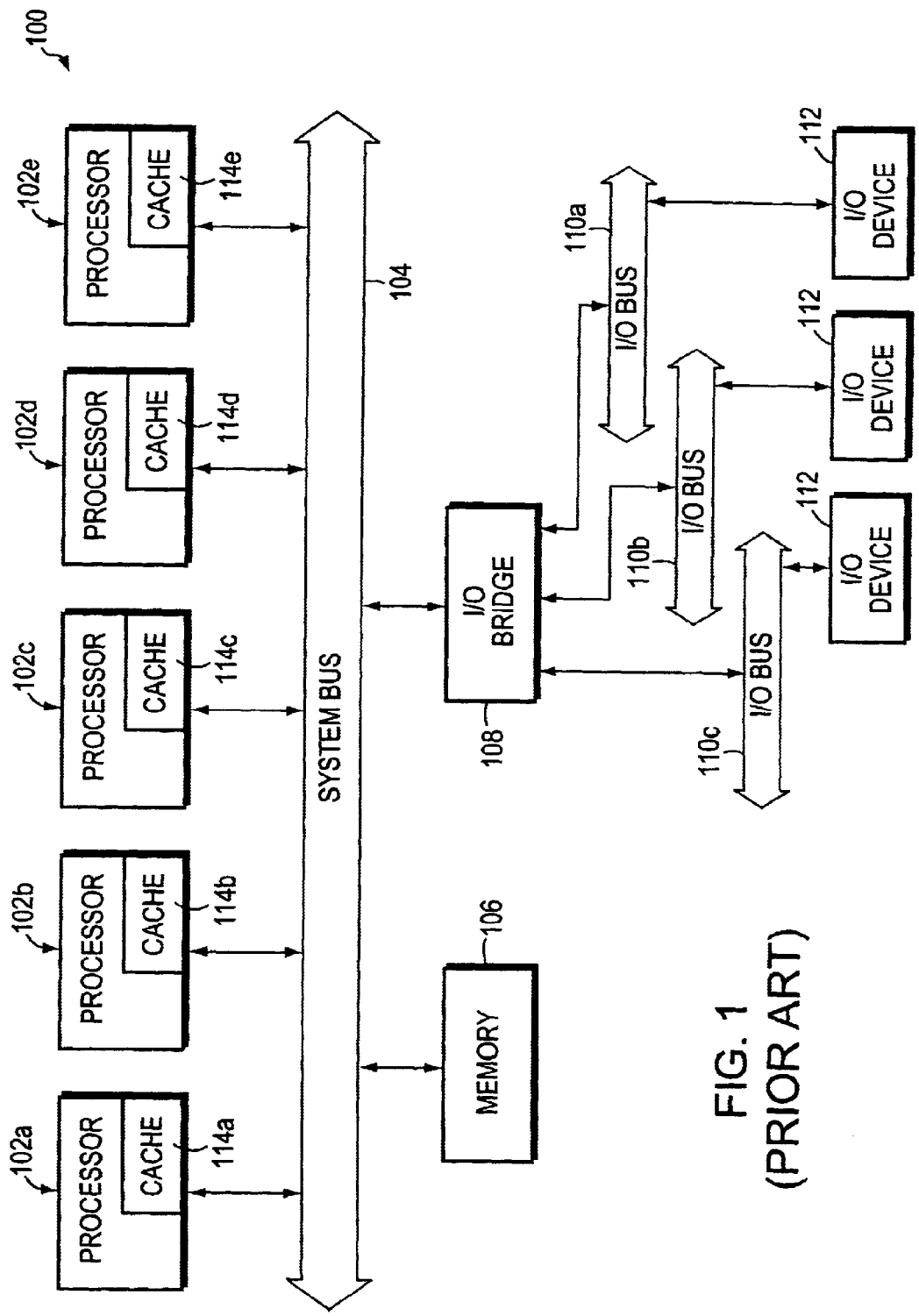
FIG. 1, previously discussed, is a schematic block diagram of a conventional symmetrical multiprocessor computer system.
Figure 2:
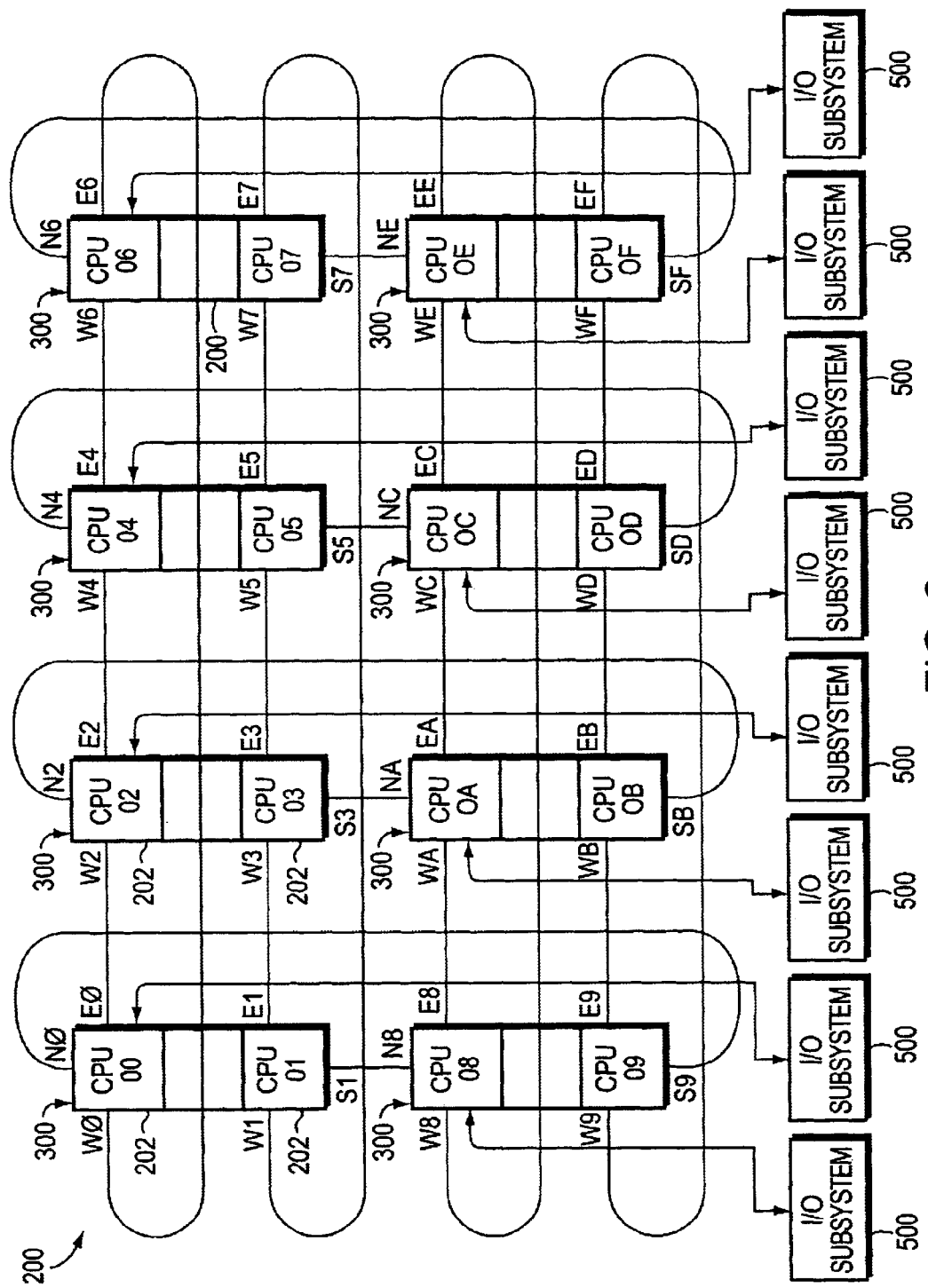
FIG. 2 is a schematic block diagram of a symmetrical multiprocessor computer system in accordance with the present invention.

FIG. 2 is a schematic block diagram of a symmetrical multiprocessor (SMP) system 200 comprising a plurality of processor modules 300 interconnected to form a two dimensional (2D) torus configuration. Each processor module 300 comprises two central processing units (CPUs) or processors 202 and has connections for two input/output (I/O) ports (one for each processor 202) and six inter-processor (IP) network ports. The IP network ports are preferably referred to as North (N), South (S), East (E) and West (W) compass points and connect to two unidirectional links. The North-South (NS) and East-West (EW) compass point connections create a (manhattan) grid, while the outside ends wrap-around and connect to each other, thereby forming the 2D torus. The SMP system 200 further comprises a plurality of I/O subsystems 500. I/O traffic enters the processor modules 300 of the 2D torus via the I/O ports. Although only one I/O subsystem 500 is shown connected to each processor module 300, because each processor module 300 has two I/O ports, any given processor module 300 may be connected to two I/O subsystems 500 (i.e., each processor 202 may be connected to its own I/O subsystem 600).

Figure 3:
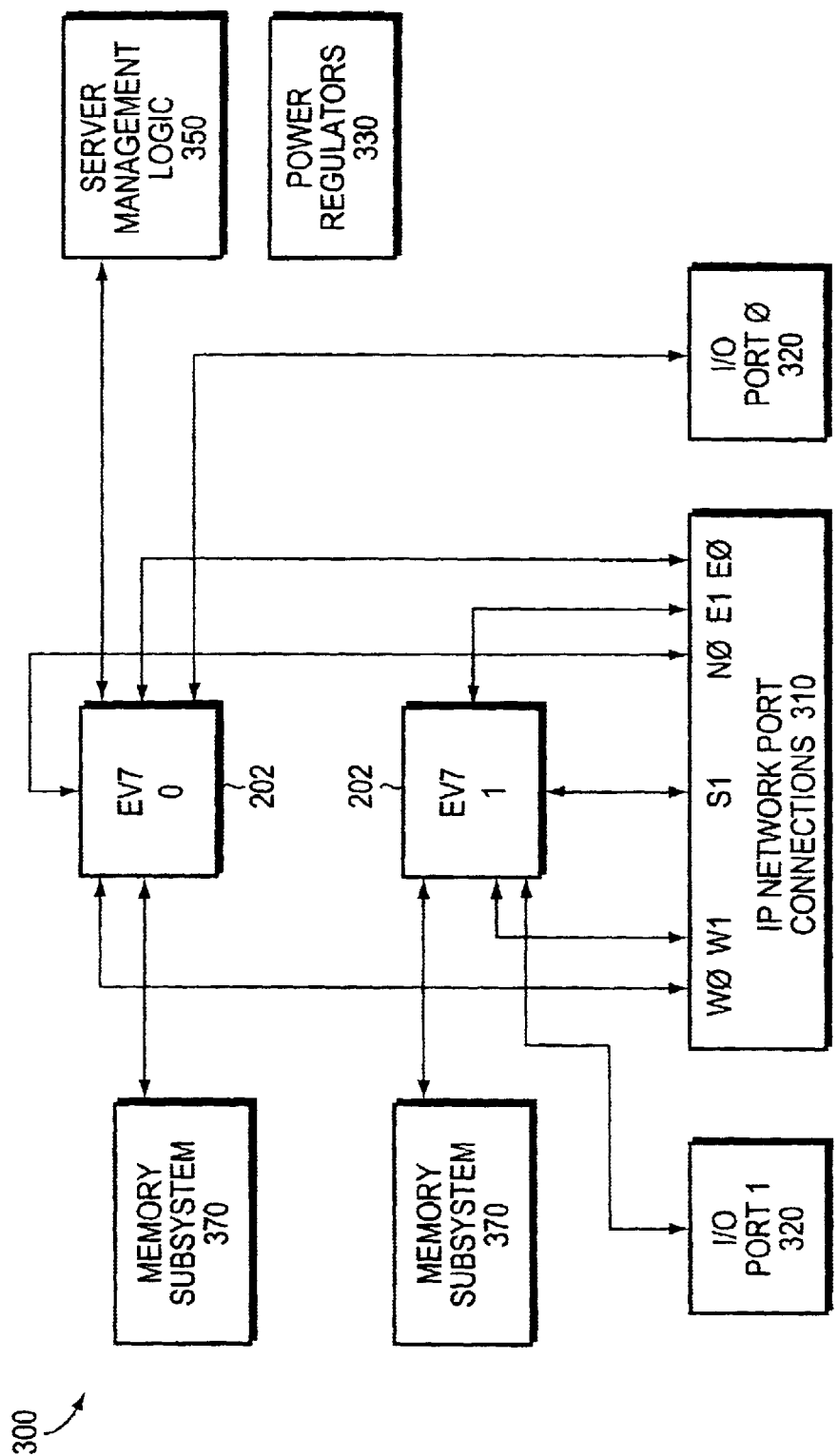
FIG. 3 is a schematic block diagram of a dual processor module of the computer system of FIG. 2.

FIG. 3 is a schematic block diagram of the dual CPU (2P) module 300. As noted, the 2P module 300 comprises two CPUs 202 each having connections 310 for the IP ("compass") network ports and an I/O port 320. The 2P module 300 also includes one or more power regulators 330, server management logic 350 and two memory subsystems 370 each coupled to a respective memory port (one for each CPU 202). The system management logic 350 cooperates with a server management system to control functions of the SMP system 200. Each of the N, S, E and W compass points along with the I/O and memory ports, moreover, use clock-forwarding, i.e., forwarding clock signals with the data signals, to increase data transfer rates and reduce skew between the clock and data.

Each CPU 202 of a 2P module 300 is preferably an "EV7" processor that includes part of an "EV6" processor as its core together with "wrapper" circuitry comprising two memory controllers, an I/O interface and four network ports. In the illustrative embodiment, the EV7 address space is 44 physical address bits and supports up to 256 processors 202 and 256 I/O subsystems 500. The EV6 core preferably incorporates a traditional reduced instruction set computer (RISC) load/store architecture. In the illustrative embodiment described herein, the EV6 core is an Alpha® 21264 processor chip manufactured by Compaq Computer Corporation of Houston, Tex., with the addition of a 1.75 megabyte (MB) 7-way associative internal cache and "CBOX", the latter providing integrated cache controller functions to the EV7 processor. However, it will be apparent to those skilled in the art that other types of processor chips may be advantageously used. The EV7 processor also includes an "RBOX" that provides integrated routing/networking control functions with respect to the compass points, and a "ZBOX" that provides integrated memory controller functions for controlling the memory subsystem.

Figure 4:
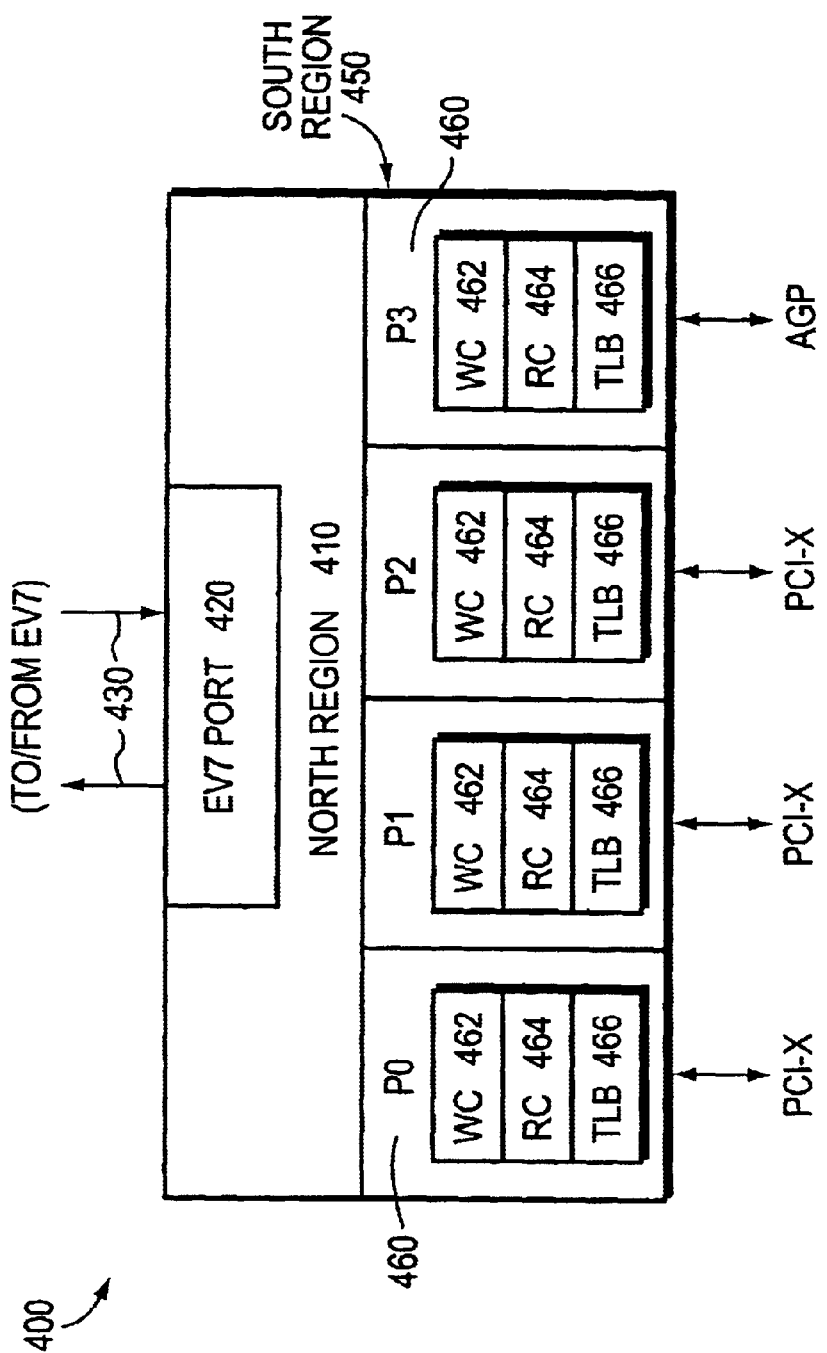
FIG. 4 is a schematic block diagram of an I/O bridge in accordance with the present invention.

FIG. 4 is a schematic block diagram of an I/O bridge 400, which may be referred to as an "IO7", that provides a fundamental building block for each of the I/O subsystems 500. The IO7 400 is preferably implemented as an application specific integrated circuit (ASIC) using IBM SA27E ASIC technology. As described above, each EV7 processor 202 includes one I/O ASIC connection; however, there is no requirement that each processor have an I/O connection. The cable coupling the IO7 400 to the EV7 202 on a 2P module 300 may be up to six meters in length. In the illustrative embodiment, the I/O subsystem 500 includes a Peripheral Component Interface (PCI) and/or PCI-Extended (PCI-X) I/O expansion box with hot-swap PCI/PCI-X and Accelerated Graphics Port (AGP) support. The PCI/PCI-X expansion box includes an IO7 400 plug-in card that spawns four I/O buses.

The IO7 400 comprises a North circuit region 410 that interfaces to the EV7 processor 202 and a South circuit region 450 that includes a plurality of I/O ports 460 (P0–P3)

that preferably interface to standard I/O buses. An EV7 port 420 of the North region 410 couples to the EV7 processor 202 via two unidirectional, clock forwarded links 430. In the illustrative embodiment, three of the four I/O ports 460 interface to the well-known PCI and/or PCI-X bus standards, while the fourth port interfaces to an AGP bus standard.

In accordance with an aspect of the present invention, a cache coherent domain of the SMP system 200 extends into the IO7 400 and, in particular, to I/O buffers or caches located within each I/O port 460 of the IO7 400. Specifically, the cache coherent domain extends to a write cache (WC) 462 and a read cache (RC) 464 located within each I/O port 460. As described further herein, these caches 462, 464 function as coherent buffers. Each port 460 of the IO7 400 may further include a translation look-aside buffer (TLB) 466 for translating I/O domain addresses to system addresses.

Figure 5:
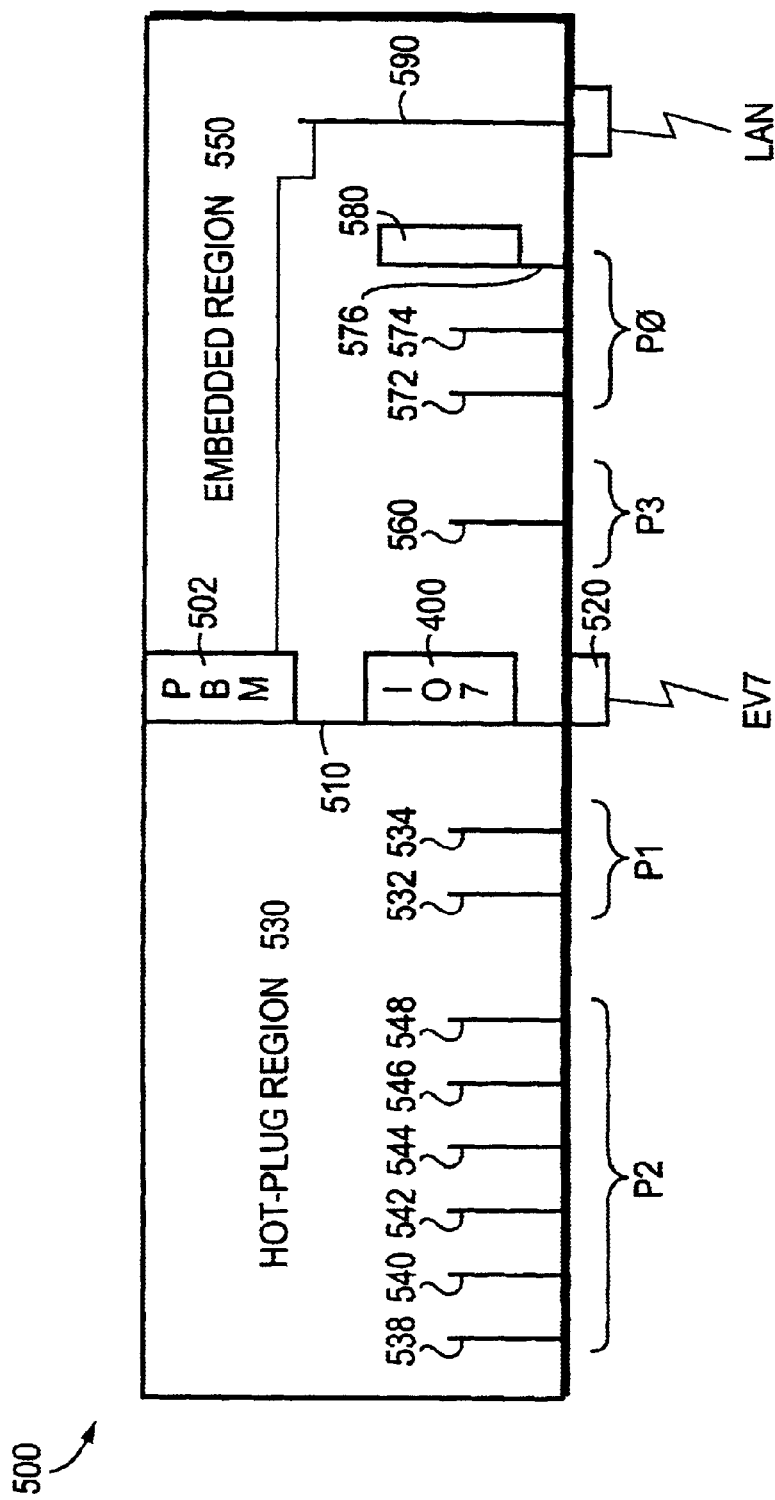
FIG. 5 is a schematic block diagram of an I/O subsystem of the computer system of FIG. 2.

FIG. 5 is a schematic block diagram of an I/O subsystem or drawer 500 of the SMP system 200. Each I/O subsystem 500 includes a first I/O riser card 510 containing an IO7 400, a connector 520 coupling the IO7 400 to its EV7 processor 202 and a plurality of I/O buses. The speed of the I/O buses contained within the I/O subsystem 500 is a function of the length and the number of loads of each I/O bus. The I/O subsystem 500 is divided into two parts: a hot-plug region 530 and an embedded region 550. In the illustrative embodiment, there is a dedicated slot 560 adjacent to the I/O riser card 510 within the embedded region 550 that is dedicated to a 4× AGP Pro graphics card. Additional slots (e.g., for power and an additional data path) may be provided to support the AGP Pro card. Also included within the embedded region 550 are three standard, 64-bit PCI card slots 572–576, which are available for embedded I/O card options. For example, an I/O standard module card 580 may be inserted within one of the PCI card slots 572–576.

Each I/O subsystem 500 also includes power supplies, fans and storage/load devices (not shown). The I/O standard module: card 580 contains a Small Computer System Interface (SCSI) controller for storage/load devices and a Universal Serial Bus (USB) that enables keyboard, mouse, CD and similar input/output functions. The embedded region 550 of the I/O subsystem 500 is typically pre-configured and does not support hot-swap operations. In contrast, the hot-plug region 530 includes a plurality of slots adapted to support hot-swap. Specifically, there are two ports 532, 534 of the hot plug region 530 dedicated to I/O port one (P1 of FIG. 4) and six slots 538–548 dedicated to I/O port two (P2). Likewise, the dedicated AGP Pro slot 560 comprises port three (P3) and the three standard PCI slots 572–576 comprise port zero (P0). The I/O buses in the hot-plug region 530 are configured to support PCI and/or PCI-X standards operating at 33 MHz, 66 MHz, 100 MHz and/or 133 MHz. Not all slots are capable of supporting all of these operating speeds.

Also included within the I/O subsystem 500 and coupled adjacent to the IO7 400 is a PCI backplane manager (PBM) 502. The PBM 502 is part of a platform management -infrastructure. The PBM 502 is coupled to a local area network (LAN), e.g., 100 base T LAN, by way of another I/O riser board 590 within the I/O subsystem 500. The LAN is provides an interconnect for the server management platform that includes, in addition to the PBM 502, a CPU Management Module (CMM) located on each 2P module 300 (FIG. 3) and an MBM (Marvel Backplane Manager).

Virtual Channels

The SMP system 200 comprises a plurality of virtual channels including a Request channel, a Response channel, an I/O channel, a Forward channel and an Error channel. Each channel may be associated with its own buffer (not shown) on the EV7 processors 202. Ordering within a CPU 202 with respect to memory is achieved through the use of memory barrier (MB) instructions,. whereas ordering in the I/O subsystem 500 is done both implicitly and explicitly. In the case of memory, references are ordered at the home memory of the cache line data in a directory in flight (DIF) data structure (table) of the EV7 202.

Within the I/O channel, write operations are maintained in order relative to write operations and read operations are maintained in order relative to read operations. Moreover, write operations are allowed to pass read operations and write acknowledgements are used to confirm that their corresponding write operations have reached a point of coherency in the system. Ordering within the I/O channel is important from the perspective of any two end points. For example, if a first processor (EV7a) communicates with its associated IO7 (IO7a), then all operations must be maintained in order.

Cache Coherency in the EV7 Domain

In the illustrative embodiment, a directory-based cache coherency policy is utilized in the SMP system 200. A portion of each memory data block ("cache line") is associated with the directory and, as such, contains information about the current state of the cache line, as well as an indication of those EV7s 202 in the system 200 holding copies of the cache line. The EV7 202 allocates storage for directory information by using bits in the respective memory storage. For example, there may be 72 bytes of storage for each 64 bytes of data in a cache line, thereby leaving 8 additional bytes. A typical implementation allocates one byte of this excess storage for error correction code (ECC) coverage on the 8 bytes. The EV7 202 may alternatively allocate a 9-bit ECC on each 16 bytes of data. The cache states supported by the directory include: invalid; exclusive is clean (processor has exclusive ownership of the data, and the value of the data is the same as in memory); dirty (processor has exclusive ownership of the data, and the value at the processor may be different than the value in memory); and shared (processor has a read-only copy of the data, and the value of the data is the same as in memory).

If a CPU 202 on a 2P module 300 requests a cache line that is resident on another 2P module 300, the CPU 202 on the latter module supplies the cache line from its memory and updates the coherency state of that line within the directory. More specifically, in order to load data into its cache, an EV7 202 may issue a read_modify request (ReadModReq) or an invalidate_to_dirty_request (InvaltoDirtyReq) message, among others, on the Request channel to the directory identifying the requested data (e.g., the cache line). The directory typically returns a block_exclusive_count (BlkExclusiveCnt) or an invalidate_to_dirty_response_count (InvaltoDirtyRespCnt) message on the Response channel (assuming access to the data is permitted). If the requested data is exclusively owned by another processor 202, the directory will issue a read_forward (ReadForward) or a read_modify_forward (ReadModForward) message on the Forward channel to that processor 202. The processor 202 may acknowledge that it has invalidated its copy of the data with a Victim or VictimClean message on the Response channel.

I/O Space Ordering

The EV7 processor 202 supports the same I/O space ordering rules as the EV6 processor: load (LD)-LD ordering is maintained to the same IO7 400 or processor 202, store (ST)-ST ordering is maintained to the same IO7 or processor, LD-ST or ST-LD ordering is maintained to the same address, and LD-ST or ST-LD ordering is not maintained when the addresses are different. All of these ordering constraints are on a single processor basis to the same IO7 400 or processor 202. Multiple loads (to the same or different addresses) may be in flight without being responded to, though their in-flight order is maintained to the destination by the core/CBOX and the router. Similarly, multiple stores (the same or different addresses) can be in flight.

The EV7 processor 202 also supports peer-to-peer I/O. In order to avoid deadlock among peer IO7 "clients", write operations are able to bypass prior read operations. This is required because read responses cannot be returned until prior write operations have completed in order to maintain PCI ordering constraints. By allowing the write operations to bypass the read operations, it is guaranteed that the write operations will eventually drain, thereby guaranteeing that the read operations will eventually drain.

Cache Coherency in the I/O Domain.

As described above, the EV7 processors 202 of system 200 implement a cache coherency protocol to ensure the coherency of data stored in their respective caches. In accordance with the present invention, cache coherency is also extended into the I/O domain. Since each IO7 400 can be up to six meters away from its respective EV7 processor 202, if not farther, IO7s can end up relatively far away from each other. To implement cache coherency across such a physically separated I/O domain, unlike the Normoyle patent where the I/O is basically on top of the CPU, among other reasons, the IO7s 400 are generally required to obtain "exclusive" ownership of all data that they obtained from the processors 202 or the memory subsystems 370, even if the IO7 400 is only going to read the data. That is, the IO7s 400 are not permitted to obtain copies of data and hold that data in a "shared" state, as the EV7 processors 202 are permitted to do. In addition, upon receiving a ReadForward or a ReadModForward message on the Forward channel specifying data "exclusively" owned by an IO7 400, the IO7 400 immediately releases that data. More specifically, the IO7 400 invalidates its copy of the data and returns either a VictimClean or a Victim message to the directory indicating that it has invalidated the data.

Figure 6:
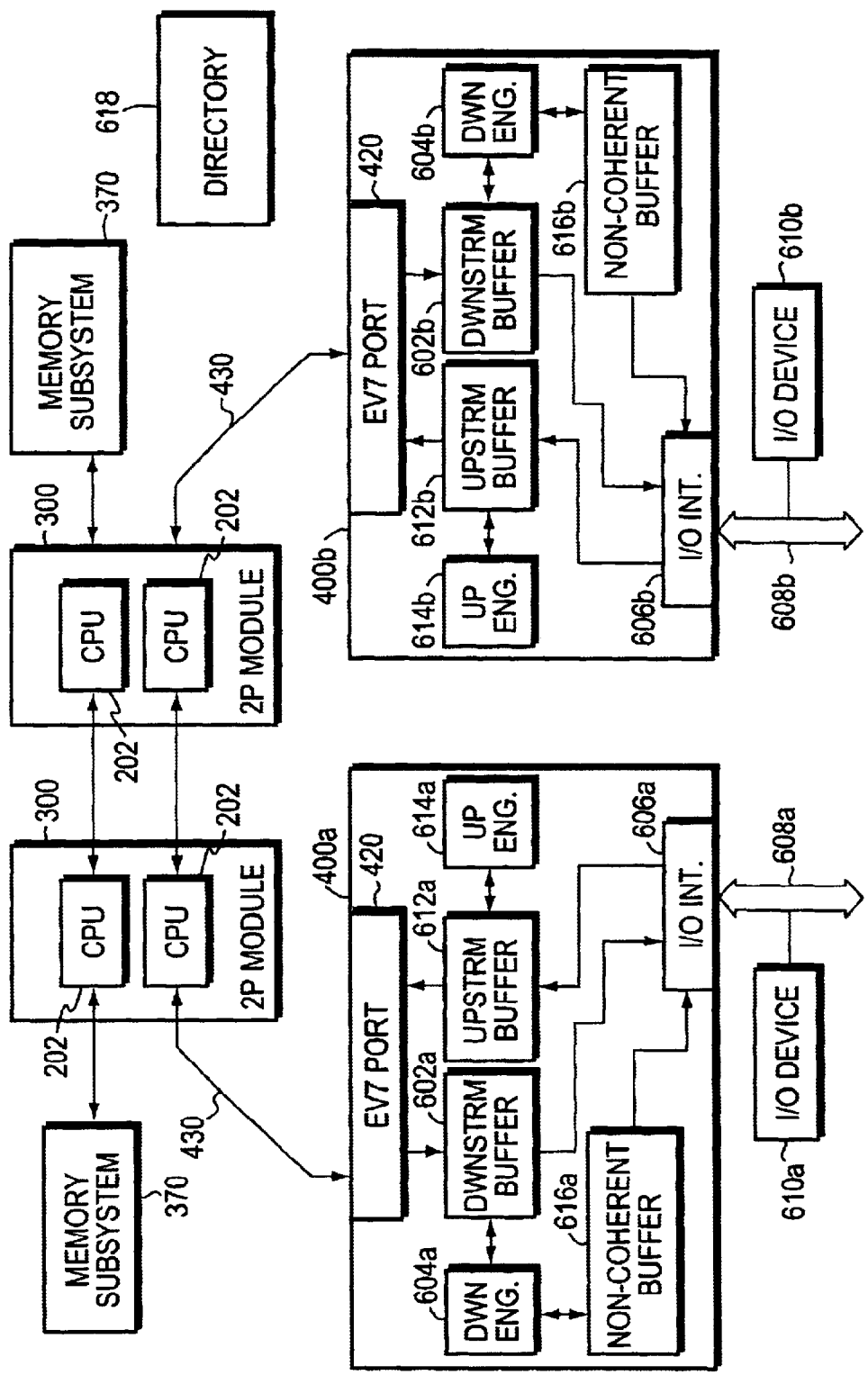
FIG. 6 is a partial block diagram of the SMP computer system of the present invention.

Although these rules maintain the coherency of data obtained by the IO7s 400, there is a potential for livelock and/or starvation among I/O devices. FIG. 6 is a partial block diagram of the SMP system 200 of the present invention including two IO7s 400a, 400b coupled to respective EV7 processors 202 of two different 2P modules 300. Each IO7 400 includes an EV7 port 420 that is coupled to the respective EV7 processor 202 by link 430. Each IO7 400 also includes one or more downstream buffers 602a, 602b that are coupled to the EV7 port 420 and are configured to store data and other messages (e.g., control, status, etc.) received from the processor 202. A down engine 604a, 604b, is which may be a DMA controller, is preferably coupled to each downstream buffer 602a, 602b for monitoring and controlling the flow of data and other information into and out of its respective downstream buffer 604a, 604b. Each IO7 400a, 400b further includes one or more I/O interfaces 606a, 606b, which may be PCI or PCI-X controllers, to which one or more I/O busses 608a, 608b may be coupled. Attached to each I/O bus 608a, 608b are a plurality of devices, such as I/O devices 610a, 610b.

Each IO7 400a, 400b further includes one or more upstream buffers 612a, 612b which are interposed between the I/O interface 606a, 606b and the EV7 ports 420. Data and other information from the I/O devices 610a, 610b is preferably received at and stored in the upstream buffers 612a, 612b. An up engine 614a, 614b, which may also be a DMA controller, is coupled to each upstream buffer 612a, 612b in order to monitor and control the flow of data and other messages therein. The up engines 614a, 614b also control the flow of data and information from the IO7s 400a, 400b to the respective EV7 processors 202 coupled thereto. The down engines 604a, 604b similarly control the flow of data and information in the downstream buffers 602a, 602b to the I/O devices 610a, 610b. Up and down engines 614, 604 are also preferably in communicating relationship with each other.

Each IO7 400a, 400b further includes at least one non-coherent buffer 616a, 616b. Down engines 604a, 604b are preferably coupled to the non-coherent buffers 616a, 616b, and buffers 616a, 616b are coupled to the I/O interfaces 606a, 606b of the respective IO7s 400a, 400b.

As indicated above, the SMP system 200 uses a directory-based cache coherency policy or protocol. In other words, the SMP system 200 includes one or more directories 618. Those skilled in the art will understand that directory 618 is preferably distributed across the processor caches and/or memory subsystems 370 of system 200, and may be maintained by processes or threads running on one or more of the EV7 processors 202. The directory 618 contains information about the current state (e.g., shared, exclusive, etc.) and location (e.g., the caches of one or more EV7 processors 202 and/or memory subsystem 370) for each cache line or data block defined by the memory subsystems 370.

As also indicated above, the data in the downstream buffers 602a, 602b of the IO7s 400a, 400b is kept coherent with the corresponding copies of that data in the processor caches and in the memory subsystems 370. By maintaining cache coherency in the I/O domain, however, problems of livelock and starvation can arise. Suppose, for example, that I/O devices 610a, 610b are each feeding a video-on-demand application, and that the entire video data is stored in the memory subsystem 370 of the SMP system 200. I/O device 610a will issue a DMA read specifying the next item of video data, in terms of a PCI-based address, requested by the user coupled to that device 610a. The DMA read travels across I/O bus 608a, is received by IO7 400a, and may be temporarily stored in the upstream buffer 612a. Up engine 614a processes the DMA read. In particular, up engine 614a translates the PCI-based address specified in the DMA read to a system address which will typically specify a single cache line of data (e.g., 64 bytes).

In the illustrative embodiment, the I/O devices 610 specify data in 32-bit addresses, whereas the SMP system 200 address space is 44 bits. A translation mechanism is thus needed to correlate locations in the smaller PCI address space with those of the larger SMP system 200 address space. As noted, an I/O TLB 466 (FIG. 4) located within each I/O port 460 is utilized to translate addresses from the I/O domain to the SMP system 200 domain. Each entry of the I/O TLB 466 is essentially a page table entry (PTE).

Because the I/O TLBs 466 can be relatively "far away" from the processor and memory components of the SMP system (e.g., up to six meters or more), they are typically not maintained in a coherent manner. Instead, in response to memory management software on the SMP system 200 modifying a page table in memory, the I/O TLBs 466 are flushed.

Upon deriving the system address of the cache line specified in the 32-bit I/O domain address, the up engine 614a will also determine whether the requested cache line is already stored in downstream buffer 602a. If the requested data is not in the downstream buffer 602a, the up engine 614a sends a ReadModReq message on the Request channel specifying the desired cache line up to the EV7 processor 202 to which IO7 400a is coupled. If the IO7 400a is running a "delayed read" messaging scheme, it will return a Retry message to I/O device 610a while it attempts to obtain the requested data from the is SMP system 200.

The EV7 processor 202 receives the ReadModReq message from IO7 400a and sends it to the directory 618, which determines where in the SMP system 200 a copy of the specified cache line is located. Suppose the requested video data is located in a given. memory subsystem 370. The video data is then read out of the memory subsystem 370 by the EV7 processor 202 directly coupled to that memory subsystem 370 and passed to IO7 400a. Since the cache line was requested by an IO7, the directory 618 changes the state associated with this cache line to indicate that it is now exclusively owned by IO7 400a. The cache line is received by IO7 400a and is stored in downstream buffer 602a.

In response to the Retry message, I/O: device 610a sends another DMA read specifying the same PCI address. The DMA read is again received by IO7 400a and processed by the up engine 614a. This time, however, the requested cache line is stored in the downstream buffer 602a. Up engine 614a notifies down engine 604a that I/O device 610a wants a cache line from downstream buffer 602a, and down engine 604a causes the cache line to be passed via I/O interface 606a and I/O bus 608a to I/O device 610a.

Suppose, however, that after IO7 400a received and stored the data, but before receiving the retried DMA read from I/O device 610a (and thus before passing the data to device 610a), I/O device 610b coupled to IO7 400b happens to be accessing the same location (in the exact same place) of the videostream data and requests the same cache line. As described above, the DMA read from I/O device 610b is translated and a ReadModReq message is passed to directory 618. The information in directory 618, however, now indicates that the requested cache line is exclusively owned by IO7 400a. Accordingly, the directory 618 sends a Read-Forward or a ReadModForward message to IO7 400a on the Forward channel identifying this cache line. Upon receiving the forward, the down engine 604a of IO7 400a immediately invalidates the cache line, and returns a VictimClean message to the directory 618. In particular, since the IO7 400a had not modified the data, it responds with a VictimClean message, i.e., acknowledging that it has invalidated the data and that the data is unmodified or "clean". As a result, the data need not be returned along with the message. Had the IO7 400a modified the data, it would respond to the forward by invalidating its copy of the data and sending a Victim message appending the modified data to the directory 618.

IO7 400a invalidates (i.e., victimizes) the data right away because it does not know when (if ever) I/O device 610a will issue a retried DMA read for the data, and does not want to hold the data "hostage" relative to other agents or entities in the system 200. In addition, IO7 400a does not know whether the forward was triggered by an EV7 processor 202 that wants the cache line in order to modify it.

Meanwhile, in response to the Retry message, suppose I/O device 610a again requests this data by issuing another DMA read. A ReadModReq message is passed to directory 618 which indicates that the requested cache line is now exclusively owned by IO7 400b. A forward message is sent to IO7 400b causing it to invalidate the data possibly before providing it to I/O device 610b. This sequence of "ping-ponging" DMA reads and forwards by and between IO7s 400a, 400b could continue, thereby blocking both I/O device 610a and device 610b from receiving the requested data. As a result, neither device 610a or 610b would make any forward progress in their respective video-on-demand applications. This situation is known as "livelock".

Figure 7A:
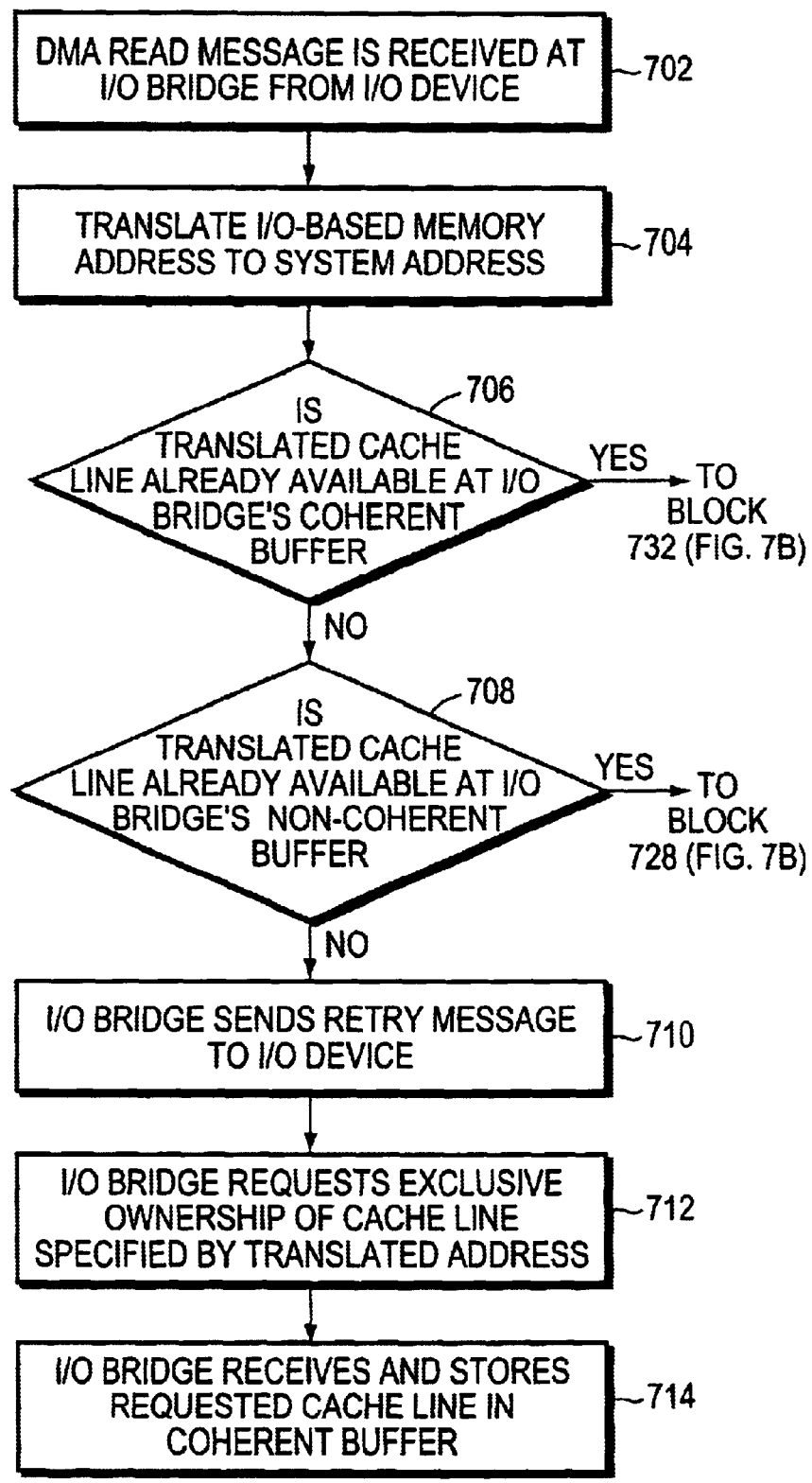
FIGS. 7A–7B are flow diagrams of the methods of the present invention.
Figure 7B:
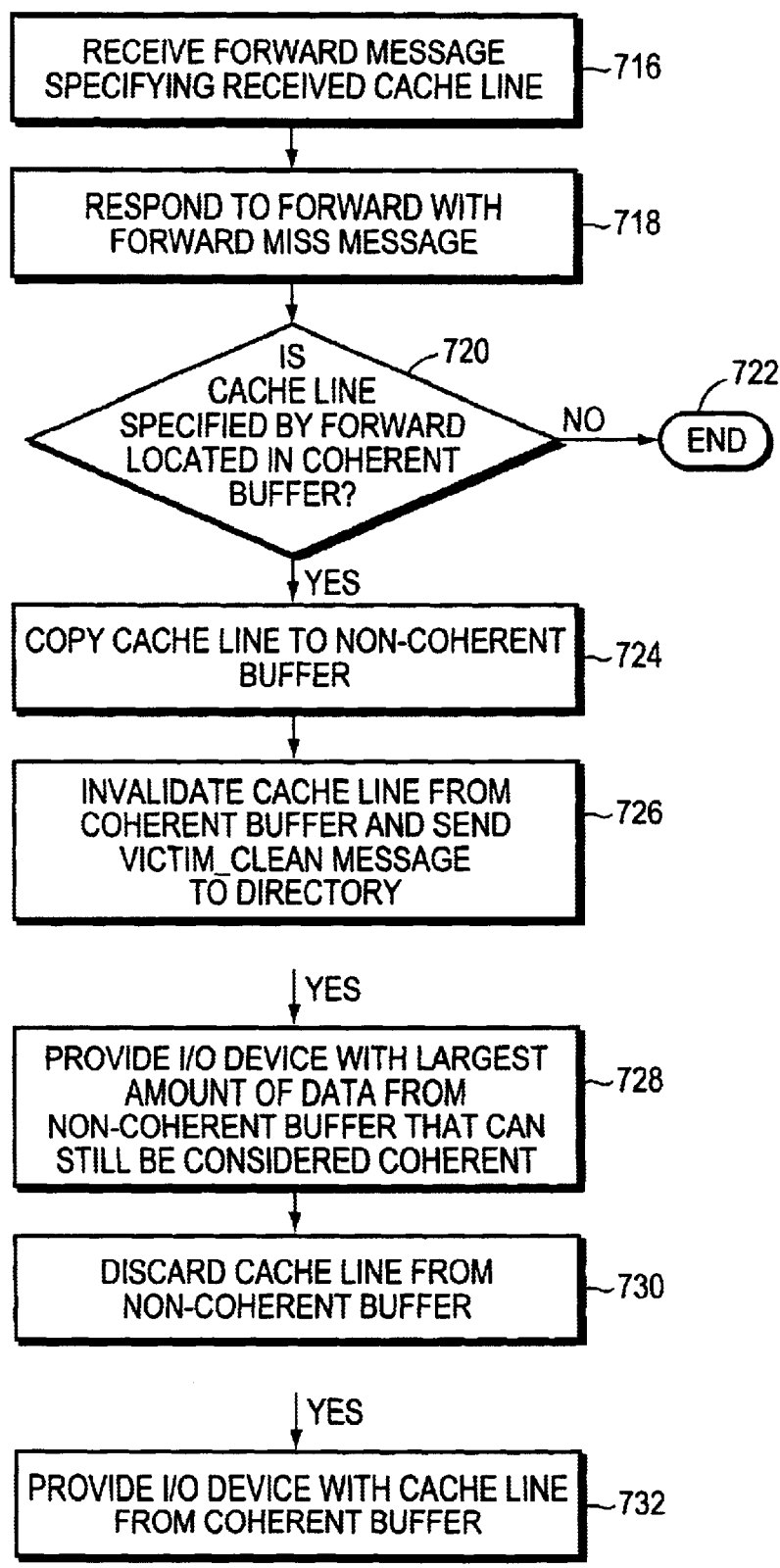

According to the invention, a system and method are provided for preventing the occurrence of livelock and for allowing two or more I/O devices that are competing for the same data to still make at least some forward progress. FIGS. 7A–B are flow diagrams of the method of the present invention. First, a DMA read is received by an IO7, such as IO7 400a, as indicated at block 702 (FIG. 7A). The DMA read will typically specify a 32-bit memory address for the requested data. Accordingly, IO7 400a translates the 32-bit address into a 44-bit system address thereby identifying a particular cache line, as indicated at block 704. The down engine 604a of IO7 400a then determines whether this cache line is already present in its coherent buffer, e.g., downstream buffer 602a, as indicated at decision block 706. If the cache line is not in downstream buffer 602a, the down engine 604a next determines whether the cache line is in the non-coherent buffer 616a, as indicated at decision block 708. If the requested cache is not present in non-coherent buffer 616a and IO7 400a is implementing a "delayed read" message scheme, the IO7 400a returns a Retry message to the I/O device 610a, as indicated at block 710. As a result of the Retry, the communication session between I/O device 610a and IO7 400a is disconnected.

Nonetheless, on the assumption that I/O device 610a will again request this data, IO7 400a requests exclusive ownership of the cache line identified by the translated address, as indicated at block 712. To do this, the IO7 400a preferably issues a ReadModReq message on the Request channel to the directory 618. The directory 618 locates the cache line, and causes it to be sent to IO7 400a which stores the cache line in its coherent buffer, e.g., downstream buffer 602a, as indicated 714. In particular, if the requested cache line is stored at a processor cache, it is. first written back to the memory subsystem 370, thereby updating the memory subsystem 370. The cache line is then read out of the memory subsystem 370 (as opposed to the processor cache) and sent to IO7 400a. The data may be appended to a BlkExclusiveCnt message sent to IO7 400a on the Response channel.

Suppose IO7 400a next receives a ReadForward message on the Forward channel specifying this cache line, as indicated at block 716 (FIG. 7B). Before IO7 400a determines whether or not it has a copy of the cache line specified in the forward, it preferably replies to the directory 618 with a ForwardMiss message on the Response channel, as indicated at block 718. The IO7 400a then searches its downstream buffer 602a for the cache line specified in the Forward message, and determines whether the cache line is stored at buffer 602a, as indicated by decision block 720. If the cache line is not in downstream buffer 602a, then IO7 400a is done processing the forward as indicated by end block 722. In this example, however, the cache line is present in downstream buffer 602a due to the delayed DMA read transaction, and thus the forward "hits" on buffer 602a.

In accordance with the present invention, the down engine 604a, in response to a forward hit, copies the cache line into the non-coherent buffer 616a, as indicated at block 724. Then, the down engine 604a invalidates the cache line from downstream buffer 602a and returns a VictimClean message to the directory 618 on the Response channel indicating that it has invalidated (i.e., victimized) the data, as indicated at block 726. The cache line is thus no longer present in downstream buffer 602a. The directory 618 can then cause the cache line to be sent from the respective memory subsystem 370 to IO7 400b for forwarding to I/O device 610b.

Meanwhile, in response to the Retry message of block 710 (FIG. 7A), I/O device 610a sends a second DMA read again requesting this same cache line to the IO7 400a, as similarly indicated by block 702 (FIG. 7A). The IO7 400a again translates the memory address from the DMA read to a 44-bit cache line address, as indicated at block 704, and determines whether this cache line is already present in its downstream buffer 602a, as similarly indicated at decision block 706. Although the cache line was in the downstream buffer 602a, as a result of the forward, it has been victimized. Accordingly, the response to decision block 706 is No and the down engine 604a next determines whether the cache line is present in the non-coherent buffer 616, as indicated at block 708. The result of decision block 708 is Yes. That is, a copy of the cache line is present in the non-coherent buffer 616a as a result of step 724 (FIG. 7B).

In this case, down engine 604a provides the largest amount of the cache line that it knows is still coherent to the I/O device 610a, as indicated at block 728 (FIG. 7B). In the preferred embodiment, this corresponds to a single I/O bus cycle worth of data (i.e., a "data beat") from the cache line in the non-coherent buffer 616a. The PCI and PCI-X and bus standards, for example, support both 32-bit and 64-bit wide bus implementations. If bus 608a is running in 32-bit mode, then the first 32-bits of the cache line from the non-coherent buffer 616a are sent to I/O device 610a at step 722. If bus 608a is running in 64-bit mode, then the first 64-bits of the cache line are sent to I/O device 610a. I/O device 610a receives and consumes the "data beat" worth of data, and is thus able to make forward progress. Down engine 604a then discards the cache line from non-coherent buffer 616a, as indicated at block 730. Since the data beat is the only available data at IO7 400a, the communication session with I/O device 610a is disconnected.

Upon consuming the one bus cycle of data, the I/O device 610a will typically issue another DMA read; this time for the next bus cycle of data, as indicated at block 702 (FIG. 7A). The PCI address specified by the DMA read is translated into a system address, IO7 400a searches its coherent and non-coherent buffers 602a, 616a and, not finding the cache line, returns a Retry message to the I/O device 610a, as indicated by blocks 702-710. The IO7 400a then issues a ReadModReq message for the identified cache line, as indicated at block 712. However, it will typically have taken some time for I/O device 610a to arbitrate and gain access to bus 608a in order to issue the DMA read for the next bus cycle of data. It will also take some time for IO7 400a to search its buffers for the specified cache line and, not finding it, issue a ReadModReq message. During this time, I/O device 610b is likely to have consumed the entire cache line. Thus, IO7400b has probably already released the cache line and begun retrieving other cache lines by the time the ReadModReq message is received at the directory 618. The directory 618 may thus not need to issue a forward, and instead the cache line can be sent to IO7 400afrom its location in memory subsystem 370 and provided to I/O device 610a.

If the cache line is still being exclusively held by IO7 400b, the directory 618 will send a forward to IO7 400b. In this case, IO7 400b may copy the cache line to its non-coherent buffer 616b, victimize the cache line from its downstream buffer 602b, and similarly provide a data beat from non-coherent buffer 616b to I/O device 610b.

If a cache line requested by an I/O device 610 is already available at the IO7's coherent buffer 602, the response to decision block 706 is Yes, and the IO7 400 provides the cache line to the I/O device 610, as indicated at block 732 (FIG. 7B).

As shown, despite the receipt of the forward at IO7 400a and the requirement that IO7 400a victimize the cache line, some data is nonetheless released to I/O device 610a, thereby allowing it to make at least some forward progress with its video-on-demand application. Moreover, by disconnecting I/O device 610a after releasing the data beat and forcing I/O device 610a to re-establish communication with IO7 400a, I/O device 610a is moved out of its previous "alignment" with I/O device 610b relative to the data being requested by the two devices. Accordingly, the two devices 610a, 610b will typically no longer be vying for the same cache line of data for their video-on-demand applications. Even if the two I/O devices 610a, 610b again line-up on the same data, the above de-scribed mechanism will allow forward progress to be made, and cause the two devices to "shift" relative to the data (e.g., cache line) being requested by each of them.

At least one data beat worth of data from the cache line can be considered coherent by the IO7s 400 and thus transferred to the I/O devices 610 despite a forward hit on the cache line. For example, suppose an EV7 processor 202 (e.g., a "producer") places "n" transactions into a memory structure, such as a circular queue that are to be read out by an I/O device 610 (e.g., a "consumer"). The producer will typically signal that these entries have been added to the queue by updating a producer index. The producer index may specify where in the circular queue the "n" transactions start. The consumer will see that the producer index has been updated and generate a read request for the queue. The IO7 400 will fetch the cache line(s) corresponding to the circular queue.

Suppose, however, that the producer then wishes to add "m" new transactions into the circular queue. The producer requests write access to the circular queue, causing the IO7 to victimize its copy of the circular queue. The circular queue at the IO7 must be victimized because the IO7 does not know if the cache line(s) that it obtained includes one or more entries to which an "m" transactions is to be written. At least the first of the "n" transactions, however, is still valid, because the producer signaled to the consumer that the "n" transactions were ready for consumption. Accordingly, the IO7 can provide at least a data beat at the starting point identified by the producer, i.e., the first of the "n" transactions.

Those skilled in the art will understand that the functionality of the up and down engines 604, 614 may be combined into a single DMA controller at the IO7 400. It should also be understood that the upstream buffer 612 may correspond to the previously discussed write cache (WC) 462 (FIG. 4), while the downstream buffer 602 may correspond to the previously discussed read cache (RC) 464. The upstream and downstream buffers 602, 612 may additionally be combined into a single buffer.

In order to support high performance I/O devices, the up engine 614 of an IO7 400, in addition to requesting the cache line specified by a DMA read, may also prefetch additional data corresponding to other cache lines that it "anticipates" the requesting I/O device 610 may need in the future. More specifically, the IO7 400 may include a prefetch engine (not shown) that executes an algorithm to identify additional cache lines based on the cache line requested by the I/0 device 610.

Figure 8:
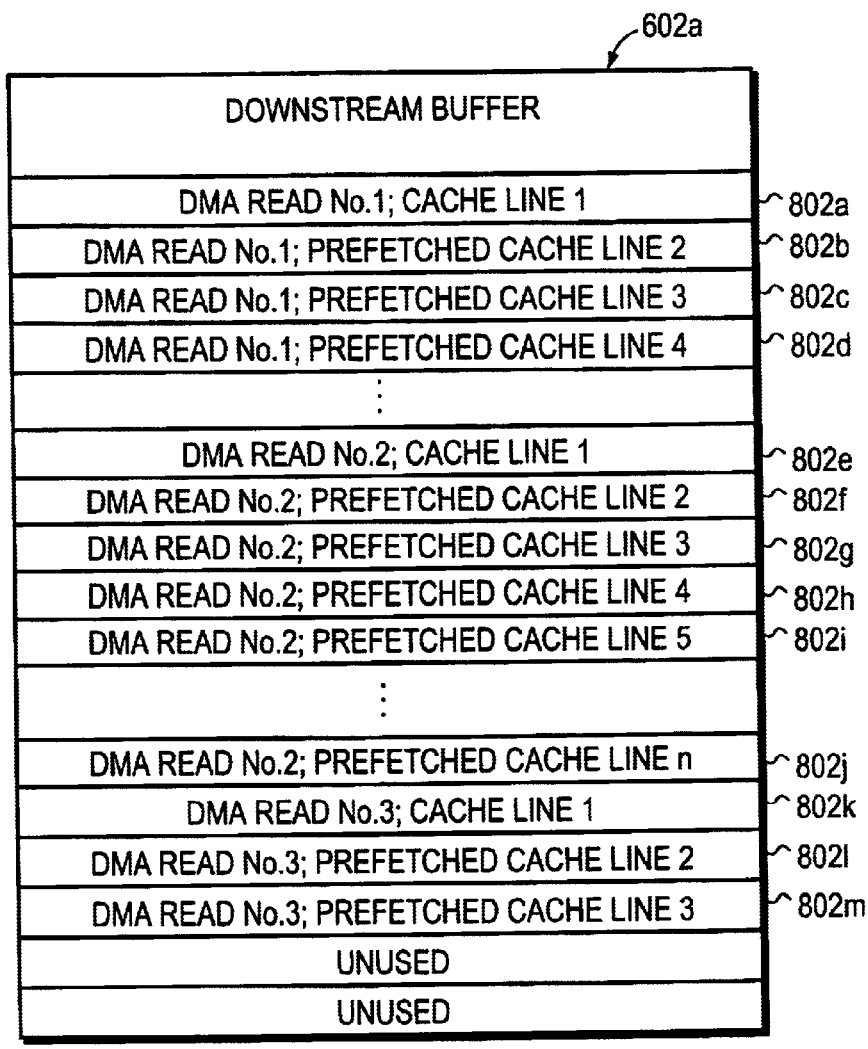
FIGS. 8 and 9 are schematic illustrations of memory buffers in accordance with a preferred embodiment of the present invention.
Figure 9:
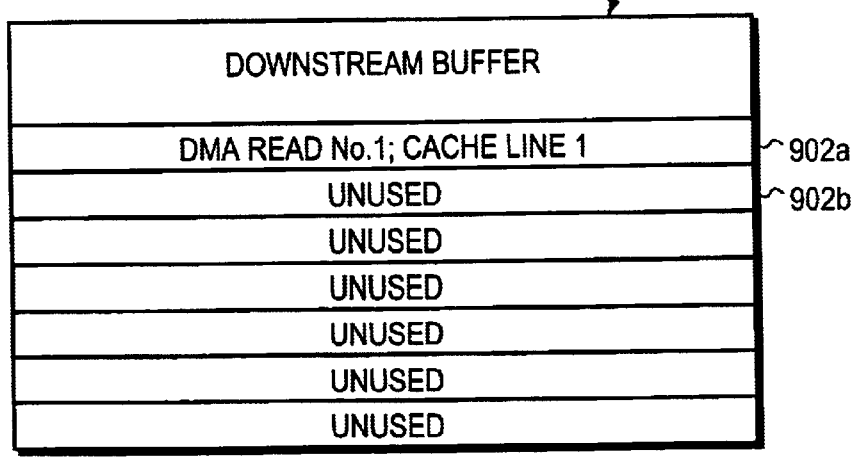

FIGS. 8 and 9 are highly schematic representations of the downstream buffer 602a and the non-coherent buffer 616a, respectively, of IO7 400a. As shown, the downstream buffer 602a is organized into a series of records 802, and each record 802 preferably corresponds to a cache line. Non-coherent buffer 616a is similarly organized into a series of records 902, and each record 902 also corresponds to a cache line. Suppose, the IO7 400a received a DMA read from I/O device 610a which translates to a particular cache line. In addition to identifying the cache line of the DMA read, the IO7 400a, through its prefetch engine, also identifies other cache lines that I/O device 610a might request in the future. All of these cache lines are preferably requested and obtained by IO7 400a and stored at records 802a–d of the downstream buffer 602a in a manner as described above. In particular, the cache line specified by the: DMA read is stored at record 802a, while the prefetched cache lines are stored at records 802b–d.

If the IO7 400a receives a forward specifying the cache line from the DMA read, the IO7 400a copies this cache line to its non-coherent buffer 616a. In particular, the cache line, which is currently stored at record 802a of downstream buffer 602a, is copied to record 902a of non-coherent buffer 616a. The IO7 400a then victimizes (e.g., invalidates) all of the cache lines obtained in response to this DMA read. That is, the IO7 400a victimizes the cache line specified by the DMA read, which is stored at record 802a, as well as all of the prefetched cache lines for this DMA read, which are stored at records 802b–d. A single data beat worth of data from the cache line copied to record 902a of the non-coherent buffer 616a may then be provided to I/O device 610a as described above.

Suppose that I/O device 610a issues a second DMA read, that is translated to another cache line, and that the prefetch engine identifies additional cache lines based on the translated cache line. These cache lines are again requested and obtained by the IO7 400a, and stored at records 802e–j of downstream buffer 602a. Suppose further that IO7 400a receives a forward, but that this forward does not specify a cache line as translated from a DMA request. Instead, the forward specifies a prefetched cache line, such as the fourth prefetched cache line for the second DMA read, which is stored at record 802h of downstream buffer 602a. In this case, the IO7 400a victimizes the cache line identified in the forward and all other cache lines that were prefetched subsequent to this cache line. In other words, the IO7 400a victimizes the cache line of record 802h (the fourth prefetched cache line as identified in the forward), and the cache lines in records 802i–j (subsequent prefetched cache lines 5 through n). No cache line is moved into the non-coherent buffer 616a (FIG. 9) in this case.

As a performance matter, it should be understood that the number of delayed DMA reads that IO7 400a can support at any time equals the number of cache lines that can be stored in the non-coherent buffer 616a (FIG. 9). This provides one cache line for each delayed DMA read, guaranteeing forward progress for each DMA read should the IO7 400a receive forwards for each DMA read. In a preferred embodiment, the non-coherent buffer 616 can hold twenty-four cache lines of data. However, those skilled in the art will understand that non-coherent buffer 616 may be designed or configured to hold more or fewer cache lines.

Figure 10:
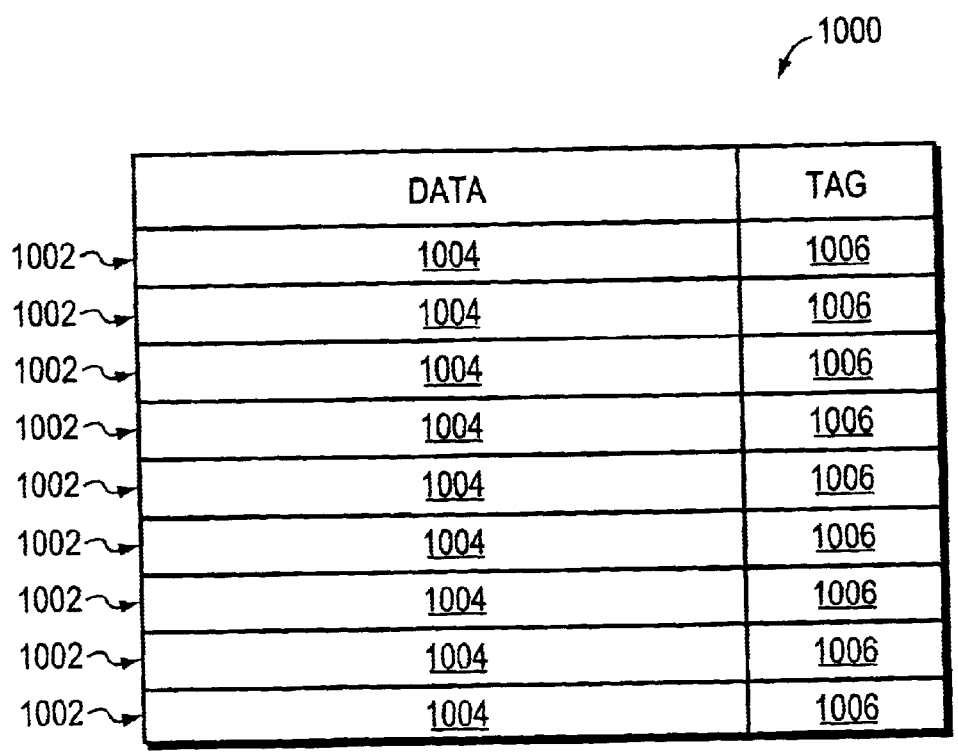
FIG. 10 is a schematic block diagram of a dual-property buffer in accordance with the present invention.

In another embodiment of the present invention, the coherent downstream buffer 602 and the non-coherent buffer 616 at the IO7 are replaced with one or more dual-property buffers. FIG. 10 is a schematic block diagram of a preferred dual-property buffer 1000. The dual-property buffer 1000 has a plurality of entries or records 1002. Each entry or record 1002, moreover, has a data space 1004 and a tag

1006. The tag 1006, which may be 1-bit, indicates whether the data stored in the respective data space 1004 is coherent (e.g., a tag of "1") or non-coherent (e.g., a tag of "0").

Suppose an I/O device issues a DMA read specifying a particular cache line. The IO7 first checks to see if the requested cache line is already stored in the dual-property buffer 1000. If not, the IO7 returns a retry message to the I/O device and issues a request for exclusive ownership of the data from the EV7 mesh. The data may be provided to the IO7 as part of a BlkExclusiveCnt message, where the Cnt (count) specifies the number of agents or entities (e.g., processors, other IO7s, etc.) having a shared copy of the data (as determined by the directory). As each of these agents or entities invalidate their copy of the data (as requested by the directory), they send an invalidate_acknowledgement (InvalAck) message to the IO7 400a. Upon receiving each InvalAck message, the IO7 400a decrements the count. When the count is "0", all of the other agents or entities that had a copy of the data have invalidated their copy, and the IO7 400a has exclusive ownership of the cache line.

Upon receiving data, the IO7 preferably stores it in the data space 1004 of a selected entry 1002 of the dual-property buffer 1000. The IO7 then sets the value of the respective tag 1006 for this entry 1002 to indicate that the data is coherent. The IO7 may wait until the Cnt reaches zero before setting the tag to the coherent value. Alternatively, the IO7 may set the tag immediately to coherent, even if the Cnt is non-zero.

If a forward is received that "hits" on this entry 1002 of the dual-property buffer 1000 before the data is provided to the I/O device, the IO7 preferably changes the tag 1006 from coherent to non-coherent. The IO7 then returns or at least schedules the return of a VictimClean message to the directory. It should be understood that the IO7 may have initially responded to the forward with a ForwardMiss before probing the contents of the dual-property buffer 1000. When the retried DMA read is received from the I/O device, the IO7 searches its dual-property buffer 1000 for the specified cache line. Although the cache line is located in the dual property buffer 1000, the IO7 notices that the tag 1006 indicates that the data is non-coherent. Accordingly, to ensure at least some forward progress, the IO7 preferably releases only that amount of the cache line that the IO7 knows to be coherent. Again, in the preferred embodiment, the amount corresponds to one "data beat" of data (e.g., one local bus cycle). After releasing the one data beat, the IO7 may victimize the cache line. Had the tag 1006 indicated that the data is coherent, the entire cache line could be released or otherwise provided to the I/O device.

It should be understood that an IO7 400 may be configured to obtain non-exclusive ownership of data in certain situations. For example, an IO7 may issue. a particular message, such as a read_invalid (ReadInval), to obtain a non-coherent (e.g., a shared) copy or "snapshot" of data for one-time use by the IO7 400. This data may stored directly in the non-coherent buffer or in the dual-property buffer with the tag set from the beginning to non-coherent.

For DMA writes, a different procedure is preferably implemented in accordance with the present invention. In particular, in response to receiving a DMA write from I/O device 610a (FIG. 6), up engine 614a translates the DMA address into a cache line address and, if the write is to a full cache line, issues a InvaltoDirtyReq message on the Request channel to the directory 618. The directory 618 responds with an InvaltoDirtyRespCnt message, where the count (Cnt) specifies the number of agents or entities (e.g., processors, other IO7s, etc.) having a copy of the data. No data is returned with the InvaltoDirtyRespCnt. As each of these agents or entities invalidate their copy of the data, they send an invalidate_acknowledgement (InvalAck) message to the IO7 400a. Upon receiving each InvalAck message, the IO7 400a decrements the count. When the count is "0", all of the other agents or entities that had a copy of the data have invalidated their copy, and the IO7 400a has exclusive ownership of the cache line. At this point, the IO7 400a may modify the cache line as specified in the instructions from the I/O device 710a, assuming there are no incomplete write transactions that are ahead of this write.

If the IO7 400a receives a forward specifying this cache line, it initially responds by sending a ForwardMiss to the directory 618. It then determines the value of the count. If the count is non-zero (meaning the IO7 400a has not obtained exclusive ownership of the cache line), the IO7 400a remembers that the forward hit occurred, but waits until it obtains exclusive ownership (e.g., the Cnt reaches zero). When the count reaches zero, the IO7 400a completes the write specified by the I/O device 610a, assuming there are no incomplete write transactions ahead of this one, and then victimizes the cache line. In particular, the IO7 400a sends a Victim message to the directory 618 (also in response to the earlier Forward) appending the modified cache line. The directory 618 can now send the modified cache line to the requesting agent or entity, e.g., some EV7 processor 202 or another IO7 400. If, at the time the Cnt reaches zero, there are one or more incomplete write transactions ahead of this one (i.e., the one generating the forward hit), the IO7 400a preferably responds with a VictimClean message to avoid holding up the data. In response, the directory 618 sends the prior copy of the cache line from memory to the requesting agent or entity.

For DMA writes to less than a full cache line, the IO7 400a preferably issues a ReadModReq message for the appropriate cache line. The directory 618 responds with a BlkExclusiveCnt message to which the data is attached. The count identifies the number of entities or agents having a shared copy of the copy. As each of these entities or agents invalidate their shared copy, they send an InvalAck to the IO7 400a. When the count reaches zero, the IO7 400a has exclusive ownership of the cache and may execute the write by merging the modified data into the cache line, assuming there are no other write transactions ahead of this one. Again, if the IO7 400a receives a forward specifying this cache line, it initially responds by sending a ForwardMiss to the directory 618. It then remembers that it had a forward hit, but waits until the count reaches zero indicating that the IO7 400a has obtained exclusive ownership of the cache line. If there are no other write transactions ahead of this one, the IO7 400a modifies the cache line (e.g., merges the modified portion) and issues a Victim message to the directory appending the modified cache line. If the count is zero but there are one or more incomplete write transactions ahead of this one, the IO7 400a preferably returns a VictimClean message to the directory and does not modify the cache line.

The foregoing description has been directed to specific embodiments of this invention. It will be apparent, however, that other variations and modifications may be made to the described embodiments, with the attainment of some or all of their advantages. For example, the IO7 could return a ForwardMiss message to the directory in response to a Forward, and then victimize the cache line after allowing the I/O device to consume at least a portion of the cache line. Therefore, it is the object of the appended claims to cover all such variations and modifications as come within the true spirit and scope of the invention.

What is claimed is:

1. A method for avoiding livelock among two or more input/output (I/O) devices of a computer system comprising a plurality of interconnected processors, one or more shared memories coupled to the processors, and at least one I/O bridge in communicating relationship with the two or more I/O devices, the processors and the one or more shared memories, the method comprising the steps of:

provide at least one coherent buffer and at least one non-coherent buffer at the I/O bridge, the non-coherent buffer coupled to the at least one coherent buffer and to at least a first I/O device by an I/O bus having a bus cycle specifying a predetermined number of bits per I/O bus cycle;

receiving a request for information from the first I/O device coupled to the I/O bridge;

storing the device requested information in the coherent buffer of the I/O bridge;

receiving a system message at the I/O bridge requesting the information stored in is the coherent buffer, the system message originating from other than the first I/O device;

copying at least a portion of the stored information to the non-coherent buffer;

invalidating the stored information within the coherent buffer; and supplying to the first I/O device at least some of the stored information copied into the non-coherent buffer, wherein the stored information supplied to the first I/O device from the non-coherent buffer is the predetermined number of bits of one bus cycle.

2. The method of claim 1 further comprising the steps of:

receiving a second request at the I/O bridge from the first I/O device requesting information;

determining whether the information of the second request is stored in the coherent buffer; and if the information of the second request is stored in the coherent buffer, supplying at least some of the information to the first I/O device.

3. The method of claim 1 wherein the predetermined bits is one of thirty-two and sixty-four bits.

4. The method of claim 2 further comprising the steps of:

if the information of the second request is not stored in the coherent buffer, determining whether the information of the second request is stored in the non-coherent buffer; and if the information of the second request is stored in the non-coherent buffer, supplying the predetermined number of bits of one bus cycle of the information to the first I/O device.

5. The method of claim 4 further comprising the steps of:

granting the I/O bridge exclusive ownership relative to the plurality of processors and the other I/O bridges of the computer system over the information stored by the I/O bridge; and following the step of invalidating, generating an acknowledgement confirming that the stored information has been invalidated by the I/O bridge.

6. The method of claim 5 further comprising the steps of:

organizing information stored in the one or more shared memories of the computer system into respective cache lines; and providing one or more cache coherency directories, the one or more cache coherency directories configured to store an ownership status for each cache line, wherein the system message requesting information originates from one or more of the directories and the acknowledgement is sent to one or more of the directories.

7. An input/output (I/O) bridge for use in a distributed shared memory computer system comprising a plurality of interconnected processors and one or more shared memories that are coupled to the processors, the I/O bridge configured to provide intercommunication between one or more I/O devices and the plurality of processors or shared memories, the I/O bridge comprising:

at least one coherent buffer configured to store information requested by a first I/O device coupled to the I/O bridge:

at least one non-coherent buffer coupled to the coherent buffer and to the one or more I/O devices by an I/O bus having a bus cycle specifying a predetermined number of bits per I/O bus cycle; and a controller coupled to the coherent buffer and the non-coherent buffer, the controller configured to:

store at least a portion of the information stored in the coherent buffer in the non-coherent buffer in response to receiving a system message originating from other than the first I/O device requesting the information stored in the coherent buffer, invalidate the information within the coherent buffer, and supply to the first I/O device at least some of the information copied into the non-coherent buffer, wherein the information supplied to the first I/O device from the non-coherent buffer is the predetermined number of bits of one bus cycle.

8. The I/O bridge of claim 7 wherein the information is organized in terms of cache lines having a plurality of bits and the predetermined number of bits that is supplied to the first I/O device correspond to one of the first thirty-two or first sixty-four bits of the respective cache line.

9. A method for avoiding livelock among two or more input/output (I/O) devices of a computer system comprising a plurality of interconnected processors, one or more shared memories coupled to the processors, and at least one I/O bridge in communicating relationship with the two or more I/O devices, the processors and the one or more shared memories, the method comprising the steps of:

providing at least one coherent buffer and at least one non-coherent buffer at the I/O bridge, the non-coherent buffer coupled to the at least one coherent buffer and to at least one of the I/O devices;

receiving a request for information from a first I/O device coupled to the I/O bridge;

storing the device requested information in the coherent buffer of the I/O bridge;

receiving a system message at the I/O bridge requesting the information stored in the coherent buffer, the system message originating from other than the first I/O device;

copying at least a portion of the stored information to the non-coherent buffer;

invalidating the stored information within the coherent buffer;

supplying to the first I/O device at least some of the stored information copied into the non-coherent buffer;

organizing information stored in the one or more shared memories of the computer system into respective cache lines; and providing one or more cache coherency directories, the one or more cache coherency directories configured to store an ownership status for each cache line, wherein the system message requesting information originates from one or more of the directories and the acknowledgement is sent to one or more of the directories.

10. A method for avoiding livelock among two or more input/output (I/O) devices of a computer system comprising a plurality of interconnected processors, one or more shared memories coupled to the processors, and at least one I/O bridge in communicating relationship with the two or more I/O devices, the processors and the one or more shared memories, the method comprising the steps of:

providing at least one coherent buffer and at least one non-coherent buffer at the I/O bridge, the non-coherent buffer coupled to the at least one coherent buffer and to at least one of the I/O devices;

receiving a request for information from a first I/O device coupled to the I/O bridge;

storing the device requested information in the coherent buffer of the I/O bridge;

receiving a system message at the I/O bridge requesting the information stored in the coherent buffer, the system message originating from other than the first I/O device;

copying at least a portion of the stored information to the non-coherent buffer;

invalidating the stored information within the coherent buffer;

supplying to the first I/O device at least some of the stored information copied into the non-coherent buffer;

issuing an initial miss message in response to the system message requesting the information stored in the coherent buffer; and searching the coherent buffer for the requested information following the issuance of the initial miss message.

11. The method of claim 10 wherein the steps of copying, invalidating and supplying occur following the searching step.

* * * * *